Patented June 22, 1948

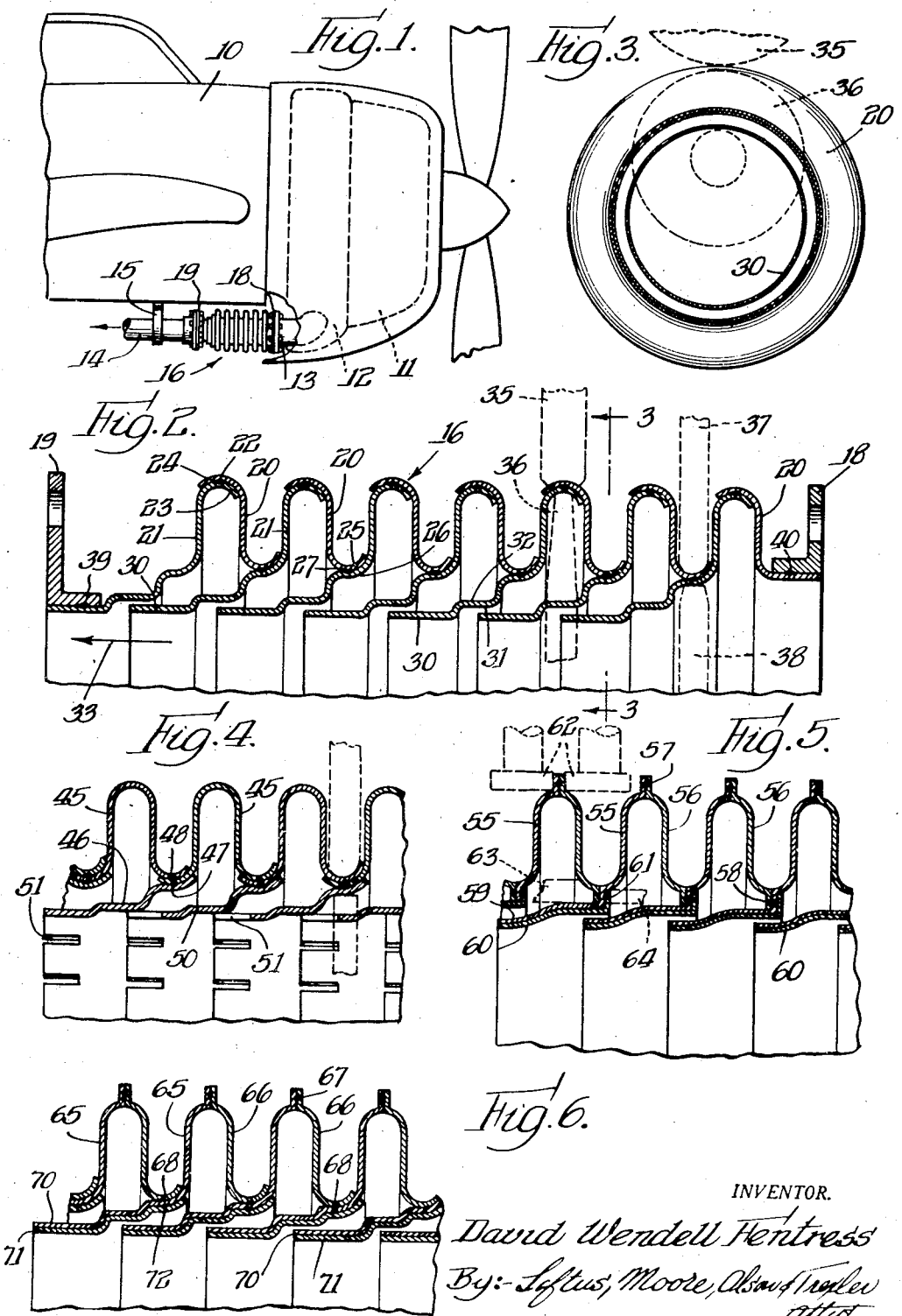

2,444,008

UNITED STATES PATENT OFFICE 2,444,008

SHIELDED TUBING OR BELLOWS

David Wendell Fentress, Barrington, Ill., assignor to Chicago Metal Hose Corporation, Maywood, Ill., a corporation of Illinois Application May 3, 1944, Serial No. 533,984

16 Claims. (Cl. 138—50)

1

This invention relates to flexible tubing and bellows structures, and particularly to means for protecting the walls and convolutions thereof from contact with and the deleterious action of fluids conducted therethrough.

It is an object of the invention to provide a flexible tubing or bellows structure of improved construction and operating characteristics. More specifically stated it is an object of the invention to provide an improved flexible tubing or bellows of the convoluted type, wherein the tubing convolutions are protected from the deleterious actions of conducted fluids, and wherein the tubing imparts a minimum resistance to flow of the conducted fluids, whereby to minimize line loss or pressure drop therein.

A further object of the invention is to provide a flexible tubing or bellows structure of the foregoing type, which can be readily fabricated and constructed.

A still further object of the invention is to provide a flexible convoluted tubing or bellows structure, with an interposed lining structure, wherein the lining may act as a bend limiting means for the tubing, if desired, and wherein the tube walls and lining may be given different operating characteristics whereby, for example, the walls may be constructed to facilitate flexibility whereas the lining is constructed to impart maximum durability and wear characteristics to the structure.

Another object of the invention is to provide an improved exhaust unit for internal combustion engines.

Still another object of the invention is to provide a superposed plate type tubing or bellows structure with an interposed lining construction, of improved construction.

Various other objects, advantages and features of the invention will be apparent from the following specification when taken in connection with the accompanying drawings, wherein certain preferred embodiments are set forth for purposes of illustration.

In the drawings, wherein like reference numerals refer to like parts throughout:

Fig. 1 is a general assembly view, partially diagrammatic in form, of an aircraft engine installation incorporating in the exhaust line thereof a flexible tubing unit constructed in accordance with and embodying the principles of the invention.

Fig. 2 is a partial longitudinal sectional view, on an enlarged scale, of the tubing unit shown in Fig. 1.

2

Fig. 3 is a transverse sectional view of the structure of Fig. 2, on the line 3—3 thereof.

Fig. 4 is a partial detail view, similar to Fig. 2, but illustrating the modified embodiment of the invention; and Figs. 5 and 6 are detail illustrative views, similar to Fig. 4, but showing further modified structural embodiments.

In the drawings the invention has been illustrated as applied to the exhaust line of an internal combustion engine, as the invention, in certain of its principal aspects is particularly adapted for a use of this character. It is to be understood, however, that the principles of the invention are adapted for use with flexible tubings and bellows generally, for various uses and applications wherein such structures may be employed.

Referring more specifically to the drawings, and first to the embodiment illustrated in Figs. 1, 2 and 3, in Fig. 1 an aircraft structure is diagrammatically and partially shown, as indicated by the reference numeral 10. The aircraft includes a driving internal combustion engine 11, which may be of conventional form, having an exhaust manifold 12. The exhaust conduit leading from the exhaust manifold comprises a first rigid section or pipe 13, rigidly secured to the exhaust manifold, and a second rigid section or pipe 14, rigidly affixed to the body of the aircraft, by means of a support bracket 15. In installations of this character, the engine 11 is conventionally mounted upon the aircraft vehicle body by means of a flexible mounting, and during operation shifts slightly relative to the body as the driving torque is applied. The rigid pipe section 13, being rigidly carried by the engine, accordingly partakes of slight shifting movements in respect to the body supported pipe section 14, during operation of the structure. To accommodate these shifting movements between the rigid pipe sections 13 and 14, a flexible tubing unit, generally indicated by the numeral 16, is interposed between the rigid pipe sections.

The details of the tubing unit are best illustrated in Figs. 2 and 3. As shown, the tubing unit comprises a circular flange member 18, by means of which the unit may be secured to the rigid pipe 13, and a circular flange 19, by means of which the unit may be secured at its opposite end to the rigid pipe 14. Interposed between the flanges 18 and 19 are a series of circular profiled metal plates, secured together to form a flexible tubing or bellows structure. Specifically there is provided a group of plates 20, generally S-shaped in cross section, interposed between and secured to a group of plates 21, of the cross sectional shape shown. The outer flanges 22 of the plates 20 overlie and are secured to flanges 23 of the plates 21, by means of a circular seam resistance weld, as indicated at 24. Similarly the inner flanges 25 of the plates 20 are secured to an intermediate complementary shaped portion 26 of the plates 21 by means of a circular seam resistance weld, as indicated at 27.

A particular feature of the structure is the manner in which means is arranged internally of the convoluted plates for protecting the plate convolutions from direct or impinging contact with the tubing conducted fluids, which are the hot exhaust gases from the internal combustion engine in the particular embodiment illustrated. As shown in Fig. 2, the baffle or lining means for the tubing is formed as a direct extension of the plates 21. To this end, as will be seen, the plates 21 are provided with extensions 30 underlying and protecting the flexible tubing convolutions. These extensions are adapted to lie in juxtaposition, as shown, and form a substantially smooth central bore through the tubing for the conducted fluids. At the same time the extensions 30 are spaced slightly from each other, so that they do not interfere with the flexing movements of the plate walls as the tubing unit is flexed or shifted in service.

It will thus be seen that a structure is produced providing a substantially smooth bore for the conducted fluids, minimizing line loss and impedance to fluid flow through the unit. Additionally, the relatively fragile convoluted walls of the unit are protected from direct impinging contact with the conducted fluids. While small spaces may be provided, as indicated at 31, between the ends of the extensions 30 and the stepped portions 32 thereof, these spaces are so disposed that fluids flowing through the unit, in the direction indicated by the arrow 33, are prevented from direct impinging contact against the convolution walls. In this way the hot exhaust gases, in the embodiment of Fig. 1, are prevented from impinging contact against the convoluted walls of the unit, materially increasing the life and durability of the structure.

The baffling of the convolution walls is obtained without impairing the desired flexibility of the structure. More particularly, the extensions 30 being in spaced relation, in no way interfere with the normal flexing movement of the convolution walls. At the same time, the extensions 30 being spaced only a slight distance apart, will automatically act to prevent flexing movements of the tubing beyond a predetermined degree. In other words, the baffle extensions in no way interfere with the normal flexing movements of the unit, but operate automatically to prevent undue bending or movement.

The plates may be welded together by means such, for example, as illustrated in my copending application, Serial No. 505,805, filed October 11, 1943. In Fig. 2 a pair of cooperative welding rollers for forming the outer circular seam resistance weld 24 are diagrammatically indicated at 35 and 36. Cooperative welding rollers for forming the inner circular seam resistance weld 27 are diagrammatically indicated at 37 and 38. As will be understood, the welding operations may be conducted progressively from the left to the right of the structure, as shown in Fig. 2, so that the baffle extensions 30 do not interfere with the welding operations. Preferably the end plate 21 is secured to the flange 19 by means of a circular seam resistance weld 39, and the end plate 20 at the opposite end of the tubing is secured to the flange 18 by means of a circular seam resistance weld 40, whereby to provide a complete welded unit with maximum durability and strength. The plates 20 and 21 are preferably of sheet metal, stamped into the desired profiled contour, as shown. The structure may thus be readily fabricated and constructed, providing a superposed convoluted plate type flexible tubing or bellows structure, with protective baffle or lining means.

In Fig. 4 an embodiment is illustrated, generally similar to that shown in Fig. 2, but incorporating certain modified features of construction. In this instance the flexible convolutions are formed from a series of plates 45, suitably profiled to effect the functions of both the plates 20 and 21, as illustrated in Fig. 2. By this means the outer peripheral welding operation is eliminated.

Also in the structure of Fig. 4 the baffle extension 46, corresponding in function and purpose to the extension 30 previously described, is provided as a separate plate, welded to the convoluted plate by a circular seam resistance weld as indicated at 47. This weld may be formed simultaneously with the weld 48 employed to secure the overlapped edges of adjacent plates together. The baffle plates 46, being separate from the plates 45, may be constructed of special heat and wear resistant metal, and also, if desired, may have a greater wall thickness than the flexible convoluted plates. By this means increased durability of the unit, when used for example as a hot gas exhaust unit, is secured. It is to be understood, however, that the plate 46 may be formed as an integral extension of the plate 45, as in the case of the extension 30, if desired.

Also as indicated in Fig. 4, the ends of the extension plates 46 may be in substantially abutting engagement with the intermediate extension plate portions 50, whereby to substantially close the opening between the baffle extensions, corresponding to the opening 31 previously described. To permit the necessary flexing movements of the unit, the extension plates may be slotted as indicated at 51. The arrangement shown increases the rigidity of the unit, while still permitting flexibility or movement as required.

In Fig. 5, a structural embodiment is illustrated, also generally similar to those previously described, except that in this instance the plate sets 55 and 56, forming the tubing or bellows unit, are butt welded at their juxtaposed edges by means of circular seam resistance welds as indicated at 57 and 58.

Also, as illustrated in Fig. 5, the baffle extension corresponding to the extension 30 of Fig. 2 in this instance constitutes a plate portion 59 formed as an integral extension of the convolution plate 55, and a plate 60 overlying the plate portion 59 is secured thereto by means of the circular seam resistance weld 61. The lining plate 60 may be made of special heat resistant metal, the plates 59 and 60 forming a composite structure of increased plate thickness and of increased wear resistant characteristics.

The welding operations, as illustrated in Fig. 5, may be carried out for example as set forth in my copending application, Serial No. 298,235, filed October 6, 1939, now Patent No. 2,347,185, dated April 25, 1944. Welding rollers for effecting the outer peripheral weld 57 are diagrammatically indicated at 62, and a welding table and cooperating welding roller for effecting the inner welds 58 and 61 are diagrammatically indicated at 63 and 64. The inner welds 58 and 61 may be first formed, and the outer plate edges thereafter welded together.

As will be understood, the various features heretofore set forth may be interchangeably employed. For example, in Fig. 6 a unit is illustrated composed of sets of convoluted plates 65 and 66, butt welded at their outer edges, as indicated at 67, and lap welded at their inner portions of engagement, as indicated at 68. As in the embodiment of Fig. 5, the baffle extension is formed by means of a plate portion 70, constituting an integral extension of the plate 65, and a separate plate 71 secured in position by means of a welded connection 72.

As will be understood, butt or overlapped joints may be interchangeably used at the inner and outer points of engagement, to meet the requirements of any particular installation.

It is obvious that various changes may be made in the specific structural embodiments set forth without departing from the spirit of the invention. Accordingly the invention is not to be limited to the specific embodiments shown and described, but only as indicated in the following claims.

The invention is hereby claimed as follows:

1. A tubing or bellows structure comprising a cylindrical tube structure formed into an aligned series of annular convolutions, said convolutions being shiftable relative to each other to provide a flexible convoluted tubing structure, and baffle means disposed internally of the convolutions, said baffle means comprising a series of relatively shiftable plates secured to the annular convolutions, said plates forming bridging means between the convolutions to provide a relatively smooth internal bore within the tubing structure.

2. A tubing or bellows structure comprising a cylindrical tube structure formed into an aligned series of annular convolutions, the walls of said convolutions being flexible whereby said convolutions are shiftable relative to each other to provide a flexible convoluted tubing structure, and baffle means disposed internally of the convolutions, said baffle means comprising a series of relatively shiftable plates secured to the annular convolutions, said plates all projecting in the same direction within the tubing structure into juxtaposition to each other whereby to shield the tubing convolutions.

3. A tubing or bellows structure comprising a series of aligned profiled plates, said plates being fixedly secured together along their engaged outer and inner portions to form a flexible convoluted structure, and baffle means disposed internally of the plates, said baffle means bridging the plate convolutions and providing a relative smooth internal bore within the tubing structure.

4. A tubing or bellows structure comprising a series of aligned profiled plates, said plates being secured together along their engaged outer and inner portions to form a flexible convoluted tubing structure, and a series of baffles disposed internally of the plates, said baffles being secured to the plates and projecting in the same direction within the tubing into juxtaposition with each other whereby to shield the convoluted structure.

5. A tubing or bellows structure as defined in claim 4, wherein said baffles are formed as integral extensions of the plates.

6. A tubing or bellows structure as defined in claim 4, wherein said baffles comprise separate plates circular seam welded to the tubing plates.

7. A tubing or bellows structure as defined in claim 4, wherein said baffles comprise separate plates secured to the tubing plates, the baffle plates having greater wear resistance characteristics than the tubing plates.

8. A tubing or bellows structure comprising a series of aligned profiled plates, said plates being fixedly secured together along their engaged outer and inner portions to form a flexible convoluted tubing structure, and a series of baffles disposed internally of the plates, said baffles being secured to the plates and projecting in the same direction within the tubing into substantially abutting engagement with each other to effect the shielding of the convoluted structure, said baffles being provided with slots extending axially of the tubing to permit the flexing of the tubing in operation.

9. A tubing or bellows structure comprising a cylindrical tube structure formed into an aligned series of annular convolutions, the walls of said convolutions being flexible whereby said convolutions are shiftable relative to each other to provide a flexible convoluted tubing structure, and baffle means disposed internally of the convolutions, said baffle means comprising a series of relatively shiftable plates secured to the annular convolutions, said plates being disposed in predetermined spaced relation from each other within the tubing, and being adapted to be brought into engagement when the tubing is flexed a predetermined amount whereby the plates act as bend limiting means.

10. A tubing or bellows structure comprising a series of aligned profiled plates, said plates being secured together along their engaged outer and inner portions to form a flexible convoluted structure, and baffle means disposed internally of the plates, said baffle means comprising a series of members secured to the plates and projecting into predetermined spaced relation from each other within the tubing, said members being adapted to be brought into engagement with each other upon a predetermined flexing of the plates whereby to operate as a bend limiting means for the tubing structure.

11. A tubing or bellows structure comprising a series of aligned profiled plates, said plates being circular seam welded along their engaged outer and inner portions to form a flexible convoluted tubing structure, and a series of baffles disposed internally of the plates, said baffles being secured to the plates and projecting in the same direction within the tubing into juxtaposition with each other whereby to shield the convoluted structure.

12. An exhaust conduit for transmitting exhaust gases and the like comprising a series of aligned profiled plates, said plates being circular seam welded together along their engaged outer and inner portions to form a flexible convoluted tubing structure, and a series of baffles disposed internally of the plates, said baffles comprising a series of profiled members secured respectively to the plates and projecting in the direction of fluid flow within the tubing, said baffles projecting into juxtaposition with each other forming a substantially continuous smooth bore within the tubing and shielding the convoluted tubing plates from direct impinging contact with the conducted fluids.

13. A tubing or bellows structure comprising a series of aligned profiled plates, said plates being welded along their outer and inner portions to form a flexible convoluted tubing structure, and a series of baffles disposed internally of said plates, said baffles comprising separate plates welded to said first plates and being arranged to project in the same direction within the tubing into juxtaposition with each other whereby to shield the convoluted structure.

14. A tubing or bellows structure comprising a series of aligned profiled plates, said plates being circular seam welded along their engaged outer and inner portions to form a flexible convoluted tubing structure, and a series of baffles disposed internally of the plates, said baffles being formed as integral extensions of certain of said plates and arranged to project in the same direction within the tubing into juxtaposition with each other whereby to shield the convoluted structure.

15. A tubing or bellows structure comprising a series of aligned profiled plates, said plates being circular seam welded along their engaged outer and inner portions to form a flexible convoluted tubing structure, a series of baffles disposed internally of said plates, said baffles comprising separate plates circular seam welded to said tubing plates and projecting in the same direction within the tubing into juxtaposition with each other whereby to shield the convoluted structure.

16. A tubing or bellows structure comprising a cylindrical tubing structure formed of an aligned series of individual annular convolutions arranged shiftable relative to each other to provide a flexible convoluted tubing structure, and baffle means disposed internally of said convolutions, said baffle means comprising a series of individual relatively shiftable plates secured to said annular convolutions, said plates forming bridge means between said convolutions to provide a relatively smooth internal bore within the tubing structure.

DAVID WENDELL FENTRESS.

REFERENCES CITED

The following references are of record in the file of this patent:

UNITED STATES PATENTS

| Number | Name | Date |
| --- | --- | --- |
| 1,145,434 | Pechstein | July 6, 1915 |
| 1,151,777 | Fulton | Aug. 31, 1915 |
| 1,255,577 | Berry | Feb. 5, 1918 |
| 1,560,789 | Johnson et al. | Nov. 10, 1925 |
| 1,905,824 | Bysthe | Apr. 25, 1933 |